Sept. 8, 1942.　　　　　F. J. KING　　　　　2,295,221
ELECTRICALLY HEATED LUNCH KIT
Filed Jan. 9, 1941　　　　　2 Sheets—Sheet 1

INVENTOR
Frank J. King
BY
ATTORNEY

Sept. 8, 1942.                F. J. KING                2,295,221
                    ELECTRICALLY HEATED LUNCH KIT
                       Filed Jan. 9, 1941          2 Sheets-Sheet 2

INVENTOR
Frank J. King
BY
Edward C. Barnes
ATTORNEY

Patented Sept. 8, 1942

2,295,221

UNITED STATES PATENT OFFICE 2,295,221

ELECTRICALLY HEATED LUNCH KIT

Frank J. King, Seattle, Wash.

Application January 9, 1941, Serial No. 373,707

5 Claims. (Cl. 219—19)

This invention relates to lunch kits, and contemplates certain improvements by means of which the kit is functionally advanced, the principal object being to provide a kit wherein is embodied an electrically-energized heating plate permitting those workers who for economic or other reasons prefer to carry a lunch to heat such parts thereof as may be desirable and by such heating provide a more enjoyable as well as a more healthful meal. Stated in more particularity, it is one of my objects to embody in a lunch kit an electric heating element so arranged and adapted that the user is permitted to readily energize the same through the instrumentality of plugging into one of the numerous electric outlets which are available throughout most factory and office buildings, and by the heat so generated toast sandwiches as well as warm other luncheon foods which, eaten cold, are relatively unpalatable.

It is a further and a particular object of the invention to provide a kit of the character described wherein, as one of its features, the lid of the box serves as a repository for the electric cord when the latter is not in use.

As a still further object, the invention aims to provide a lunch kit wherein, to shield the cord against heat stored in the electric plate when the lid is closed following use of the kit, a partitioning member is engineered into the kit to normally lie in intervening relation between the electric plate and the cord and which, as an added office, permits use as a service tray when partaking of the food content of the kit.

Numerous other objects and advantages, especially pertaining to the mode of assembling the electric plate to have the same occupy a minimum of space and, for cleaning or other reasons, to permit the plate to be readily detached from the kit, will become apparent in the course of the following description and claims, the invention consisting in the novel construction and in the adaptation and combination of parts illustrated in the accompanying drawings and hereinafter described and claimed.

Figure 1:
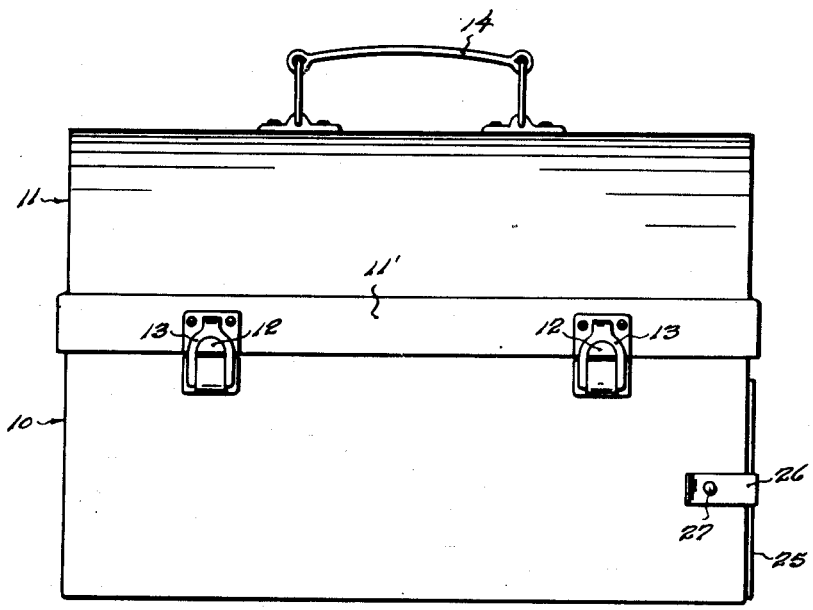
Figure 1 is a view in front elevation representing the preferred embodiment of a lunch kit constructed in accordance with the teachings of the present invention.
Figures 2, 3:
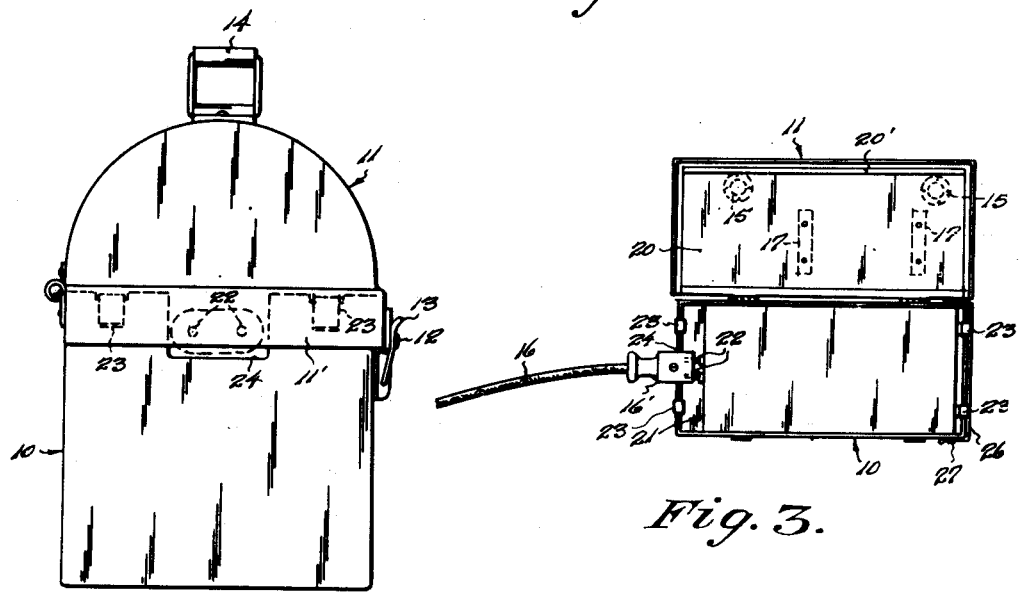
Fig. 2 is an end elevation thereof.
Fig. 3 is a somewhat schematic top plan view taken to a reduced scale to show the kit in open position with the cord attached to the heating plate preparatory to warming a meal.
Figure 4:
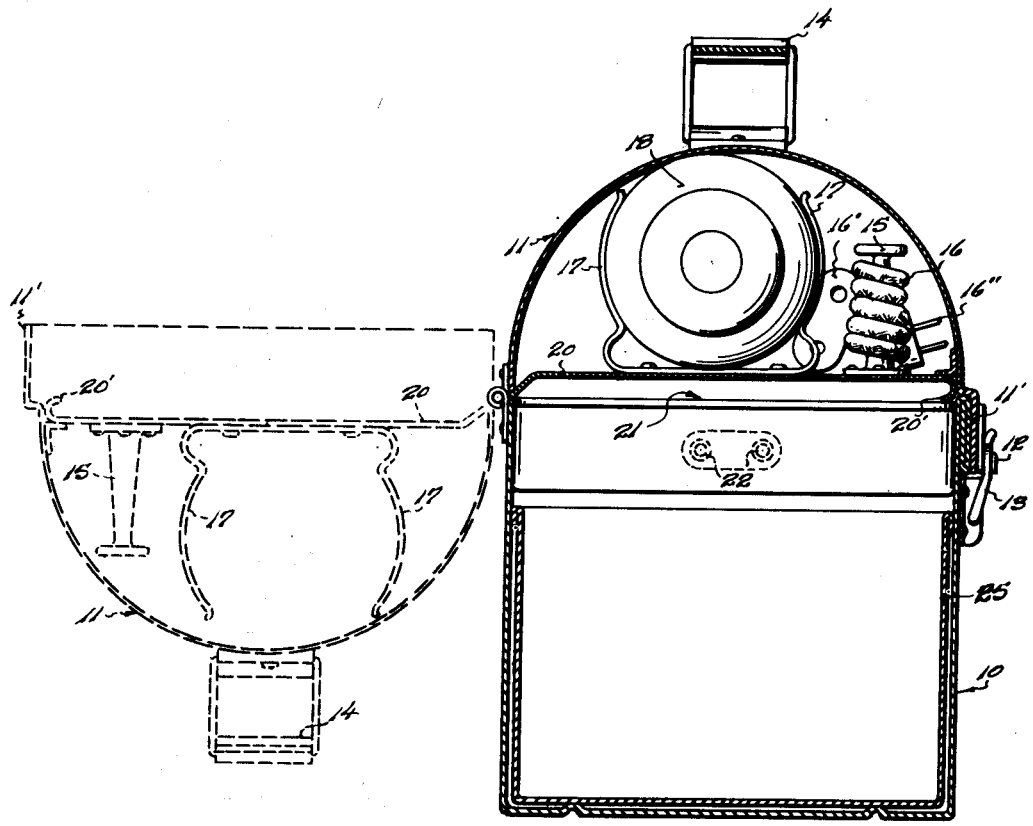
Fig. 4 is a transverse vertical section, with dotted lines being employed to indicate the position of the lid when the same is laid back to expose the heating plate and the service tray for use.
Figures 5, 6:
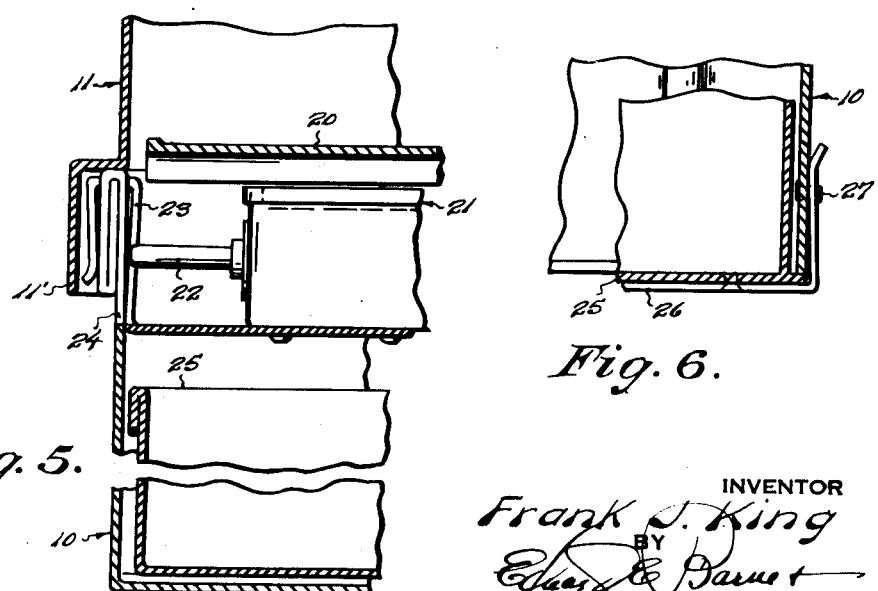
Fig. 5 is a fragmentary longitudinal vertical section to an enlarged scale detailing the manner in which the heating element is hung for detachability from the walls of the kit.
Fig. 6 is a fragmentary horizontal section detailing the spring clip assembly which I employ to releasably secure the food hamper, represented as a drawer, in the kit.

It will be readily understood, while a preferred embodiment of the invention is illustrated in such drawings and such preferred embodiment hereinafter described, that the invention admits of various modifications which will readily occur to those versed in the art. Describing, therefore, the illustrated kit without in any way intending to imply limitations thereby excepting as such limitations are specifically recited in the annexed claims, the box proper is more or less conventional in that it provides an approximately rectangular bottom part 10, open at the top, and a hinged lid part 11 produced with a marginal skirt 11' arranged to overlie the rim of the bottom part and supplied with staples 12 adapted to be engaged by hasps 13 carried by the bottom part. A handle for the lid is denoted by 14. The lid is domed and within the chamber provided thereby are the usual clips 17 which accommodate a Thermos bottle, as 18, and to one side of these clips at opposite ends of the chamber are post elements 15 about which are wrapped an electric cord 16, the cord being of ordinary form having the usual plug fittings 16'—16" at opposite ends. Carrying such clips 17 and post elements 15 is a relatively flat plate 20 which is applied as a closure for the lid chamber, such plate finding a pivotal mounting about the lid hinge and being given a frictional engagement as between its free edge and the opposite wall of the lid, this free edge being curled outwardly as at 20' to function as a finger hold. As shown in Fig. 3, and also represented by dotted lines in Fig. 4, the plate 20 in addition to its closure function acts in the open position of the lid as a service tray.

Referring now to the heating plate designated by 21 and which is or may be of standard construction with terminals 22 adapted to be engaged in the fitting 16' of the cord 16, thereby to close an electric circuit from a wall outlet through electrically energized heating elements within the plate, it will be seen that such heating plate is applied in the open upper end of the bottom part 10 and is removably mounted through the instrumentality of hangers which are indicated as being formed with hooked spring terminals 23 arranged to be wedged over the rim of said bottom part. Said rim, to accommodate the introduction of the cord fitting 16', is cut away as at 24.

Functioning as a hamper for the food is a drawer 25 working through an end opening of the bottom part, and overlying the end wall of this drawer is a strap 26 of spring steel having the ends turned in to overlie the sides and arranged, in the closed position of the drawer, to snap over pins 27 fixed to the side walls of the kit. It is intended that said food drawer be fitted with suitable clips or the like by which eating utensils are supported within the same, such clips, for simplicity in illustration, being deleted from the drawings. Also provided but likewise deleted for simplicity in illustration is a warming pan for use in heating soups or the like.

The advanced kit and the manner of its usage are believed to be clear from the foregoing description taken in connection with the illustration of the preferred embodiment.

What I claim is:

1. In a lunch kit, in combination: a portable lunch box formed to provide a compartment for a prepared lunch; a heating plate provided with box-engaging means for detachably suspending the plate in secured relation to the box, said plate having an electric heating element housed therein and, for energizing said element, being provided with a pair of complementary exposed prongs fixedly associated with the plate and arranged for direct plug-in connection with the end fitting of an electric cord the electric energy to which is derived from the electric outlet of a house circuit, and a handle operatively associated with the box for carrying the same.

2. In a portable lunch kit, in combination: an open-top box-like body formed with a lunch compartment in the bottom portion thereof; a heating plate removably mounted in said top opening having an electric element housed therein and, for energizing said element, being provided with a pair of complementary exposed prongs fixedly associated with the plate and arranged for direct plug-in connection with the end fitting of an electric cord the electric energy to which is derived from the electric outlet of a house circuit; and a lid for said body part provided with a handle for carrying the kit.

3. A lunch kit according to claim 2 characterized in that the removable mounting for the heating plate is comprised of a severalty of spring clips supporting the heating plate and arranged to detachably hook over the rim of said body part.

4. A lunch kit according to claim 2 characterized in that the end wall of the body part is cut away to form an opening accommodating said end fitting of the electric cord, and in which the lid provides a marginal skirt adapted in the closed position of the lid to overlie said opening for protecting the prongs.

5. In a portable lunch kit, in combination: a lunch box produced in the form of an open-top box-like body having a lunch compartment in the bottom portion thereof; a heating plate provided with means for detachably supporting the same in the top opening of the box body, said plate having an electric element housed therein and, for energizing said element, being provided with devices arranged for direct plug-in connection with the end fitting of a free electric cord the electric energy to which is derived by connection with the electric outlet of a house circuit; a domed lid for said body part hingedly connected to the latter and adapted to form a chamber to receive the electric cord and a Thermos bottle; a relatively flat closure for the chamber of the lid hingedly connected to the lid to normally occupy an intervening position between said chamber and the heating plate whereby to act as a baffle for deflecting the stored heat of the heating element from the chamber, said plate in addition to its heat-deflecting office functioning, in the open position of the lid, as a service tray for the kit, and a handle operatively associated with the kit for carrying the same.

FRANK J. KING.